United States Patent [19]
König, deceased et al.

[11] Patent Number: 5,486,048
[45] Date of Patent: Jan. 23, 1996

[54] APPARATUS FOR TREATING DOUGH

[76] Inventors: Helmut König, deceased, late of Graz, Austria; Elisabeth König, heiress, Ursprungweg 70, Graz, Austria, A-8045

[21] Appl. No.: 178,289

[22] PCT Filed: Jul. 9, 1992

[86] PCT No.: PCT/AT92/00089

§ 371 Date: Jan. 10, 1994

§ 102(e) Date: Jan. 10, 1994

[87] PCT Pub. No.: WO93/00818

PCT Pub. Date: Jan. 21, 1993

[30] Foreign Application Priority Data

Jul. 12, 1991 [AT] Austria ................. 1412/91

[51] Int. Cl.$^6$ ............ A21C 5/04; A21C 7/06; A21C 7/04; A21C 9/04
[52] U.S. Cl. .......... 366/76.8; 99/450.1; 99/462; 366/77; 366/93; 366/143; 425/238; 425/241
[58] Field of Search ............ 99/353, 450.1, 99/348, 462; 366/76.8, 77, 93, 100, 143, 142, 151, 160; 425/220, 239, 233–236, 238, 99, 167, 169, 335, 147, 241; 426/500, 501

[56] References Cited

U.S. PATENT DOCUMENTS

| | | |
|---|---|---|
| 2,178,406 | 10/1939 | Cecil. |
| 2,270,512 | 1/1942 | Devlin. |
| 3,733,058 | 5/1973 | Konig ................. 366/76 |
| 3,785,623 | 1/1974 | Konig ................. 366/76 |
| 4,013,275 | 3/1977 | Schroder et al.. |
| 4,210,402 | 7/1980 | Schroder et al. ............ 366/143 |
| 4,211,492 | 7/1980 | Konig et al. ............... 366/181 |
| 4,580,903 | 4/1986 | Ihler et al. ................. 366/91 |
| 4,684,040 | 8/1987 | Jonovic et al.. |
| 5,158,785 | 10/1992 | Konig ....................... 425/233 |
| 5,227,174 | 7/1993 | Konig ....................... 425/147 |

FOREIGN PATENT DOCUMENTS

| | | |
|---|---|---|
| 346788 | 11/1978 | Austria. |
| 391590 | 10/1990 | Austria. |
| 391401 | 10/1990 | Austria. |
| 392195 | 2/1991 | Austria. |
| 483268 | 9/1929 | Germany. |
| 2943088 | 5/1981 | Germany. |

*Primary Examiner*—Timothy F. Simone
*Attorney, Agent, or Firm*—Salter & Michaelson

[57] ABSTRACT

An apparatus for the treatment of dough, in particular portioning and kneading, has a drum (2) rotatable around a horizontal axis and provided on its periphery with receiving openings (3, 4) for the dough. In these receiving openings the dough is treated, for example by a kneading member. In each receiving opening (3, 4) a piston (43) is guided in radial direction of the drum along a restricted guidance (46) that on its entire is rotatable relative to the drum (2). The restricted guidance consists of at least two members (91, 92) adjustable relative to each other and completing each other effectively to the common restricted guidance (6) and always reliably guiding the pistons (43). By relative adjustment of the two members (91, 92), the treatment conditions on a station can be changed without influencing the other stations.

15 Claims, 10 Drawing Sheets and 5,486,048

APPARATUS FOR TREATING DOUGH

BACKGROUND AND SUMMARY OF THE INVENTION

The invention relates to an apparatus for treating dough, in particular for portioning and, respectively, or kneading dough, comprising a drum stepwisely rotatable around a horizontal axis and provided on its periphery with receiving openings for dough portions, at least one treatment member for the dough, a piston in each receiving opening guided within the receiving opening in radial direction of the drum, and a curved restricted guidance for the pistons for radial inward and outward movement of the pistons during at least one phase of the treatment, which restricted guidance guides the pistons inwardly and outwardly, with respect to the radius of drum and is automatically adjustable relative to the drum at least in the phases of stillstand of the drum motion.

Such apparatus are known (for example AT-PS 341 970). Generally they have four rows of receiving openings distributed in equal distances around the periphery of the drum, that means always displaced with respect to each other for 90°. The stepwise advance of the drum causes a rotation of the drum for 90° per step, so that the receiving openings are conveyed from station to station, where the treatment of the dough takes place, for example portioning or kneading. Within the above mentioned known apparatus, a portioning station is disposed at the one side of the drum, at which station the dough is pressed into the receiving openings by means of a pusher member and is portioned by a shearing edge when the drum moves again. Within the region of the summit of the drum a kneading station is provided at which a kneading tool ist disposed that kneads the dough pieces accommodated within the receiving openings into a ball-like shape. At the other side of the drum a deposit station is disposed at which the dough pieces are ejected from the receiving openings by an outward movement of the pistons. This outward movement of the pistons is obtained by the restricted guidance of the pistons which is rotated relative to the drum during the stillstand thereof, the curvature of this restricted guidance effecting the desired outward movement of the pistons at the deposit station. At the same time, during this relative rotation of the restricted guidance, the pistons are retracted at the portioning station, in order to suck-in the dough which has to be pressed-in into the receiving opening. Also at the kneading station a retraction of the pistons takes place during the kneading process, in order to consider that the dough piece requires more and more space during the kneading process. The known apparatus works without any problem as long as the distances for which the pistons are moved forwardly or, respectively, backwardly at the single stations, are not changed for a too great extent. Such a change, however, is necessary at the portioning station, if the dough piece to be weighed there has to be changed with respect to its volume or, respectively, weight, that means, that for example, one must change from the production of smaller dough portions to the production of bigger dough portions or vice versa. For this, it is indeed known from the initially described construction to additionally adjust the restricted guidance relative to the drum by means of an adjustment device, that means, as it were, to change the starting position of the relative movement between restricted guidance and drum. Thereby, at the portioning station a more or less long retraction of the pistons can be adjusted at choice. However, difficulties arise, if this adjustment should be made to a comparatively large extent, because then a considerable change of the said starting position of the restricted guidance is necessary. This change influences the circumstances at the kneading station and at the deposit station so that there the optimal positions of the pistons during the kneading process cannot more be obtained or, respectively, the dough pieces are no more reliably ejected from the receiving openings.

The invention has at its object to improve an apparatus of the initially described kind so that the circumstances at one station can be changed at choice for a large extent without influencing the other stations. The invention solves this task by the features that the restricted guidance comprises at least two curved path sections provided on at least two members that are adjustable relative to each other and effectively complete each other to the common restricted guidance. By this, the above described problem is solved with simple constructive effort. The parts of the restricted guidance disposed on the single elements further guide the pistons always so that these pistons cannot swing neither inwardly nor outwardly, so that they are always guided exactly. Nevertheless, by the adjustment of the single members relative to each other it can be obtained that changes of the restricted guidance are possible at the single stations without that the guidance effective for the other stations is also changed. Thereby, a wide field of variations is possible to adjust the conditions of treatment at the single stations at choice, for example, at the portioning station the weight or, respectively, the volume of the dough pieces to be portioned can be changed to a large extent without that this change influences the kneading process or the deposition process of the dough pieces.

As a rule, two members are sufficient, the relative position of which can be varied, however also more than two such members may be provided, for example, such a member may be allocated to each one of the three said stations. However, if portioning, kneading and deposition of the dough pieces should take place at one single drum, the principle is retained that at the portioning station the pistons are retracted, and also at the kneading station, whereas at the deposit station the pistons are moved outwardly. Just so, always the general principle of function is retained that at least portions of the restricted guidance are moved during the stillstand of the drum in order to obtain these movements of the pistons.

Within the spirit of the invention there are several possibilities to obtain the relative adjustment of the single elements constituting the restricted guidance: According to a particular favourable embodiment of the invention, the arrangement can be such that at least two members carrying the curved paths are adjustably rotatable relative to each other around a common center. This results in a construction easy to survey and having a simple possibility for the drive. However, within the spirit of the invention, the embodiment can also so constructed that at least two members carrying the curved path are adjustably spreadable from each other at one side, thus substantially like the single sectors of a fan. Within this, in each case there is a simple possibility for the drive within the spirit of the invention by the fact that the members carrying the curved path are disposed on shafts or, respectively, hollow shafts concentrically bearingly supported in each other and rotatable relative to each other by adjustment means. The amount of this rotation as well as the angular velocity can be chosen to enable one to adapt one to varying requirements. Thus, within the spirit of the invention the embodiment can be so chosen that the adjustment means comprise a cam rotated by the drive means and at its periphery being contacted by a rocker lever connected to the shaft of one of the members. The shape of this cam determines in such a case the amount and the angular velocity of rotation of the respective member. This enables one to obtain again changes of the piston movements occuring during the single treatment processes by exchange of the cam against a cam of different shape. In addition thereto, within the spirit of the invention the arrangement may be such that the drive means comprises a further curved path from which as well the stepwise advance movement of the drum as also an adjustment of at least one curved path of the restricted guidance are derived, the duration of each step of movement of the drum being shorter than the intervening intervals. Thereby, in the intervals of the drum movement, more time for the treating processes is obtained, what in particular for the kneading process is of substantial advantage, since the quality of the kneaded dough piece to a high degree depends from the duration of time being at disposal for the kneading process. Thereby it is also facilitated to adapt one to varying conditions.

BRIEF DESCRIPTION OF THE DRAWINGS

Further features and advantages of the present invention result from the description of examplative embodiments of the subject matter of the invention shown schematically in the drawings.

Figure 7:
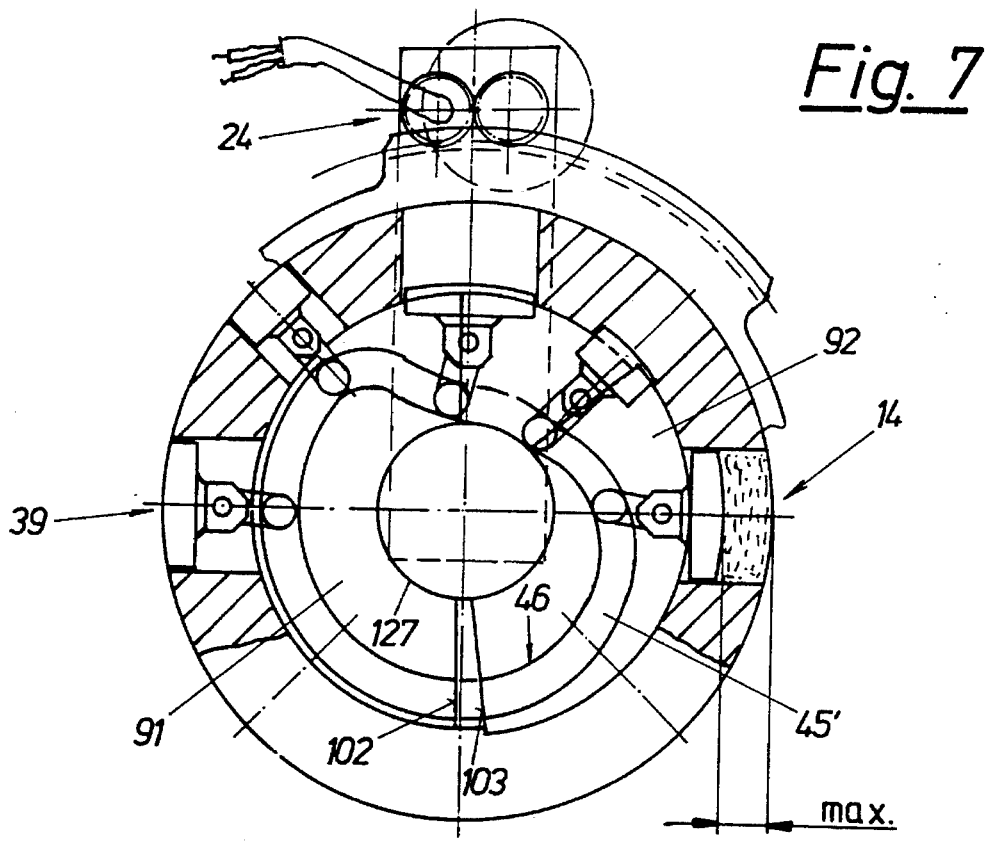
Figure 8:
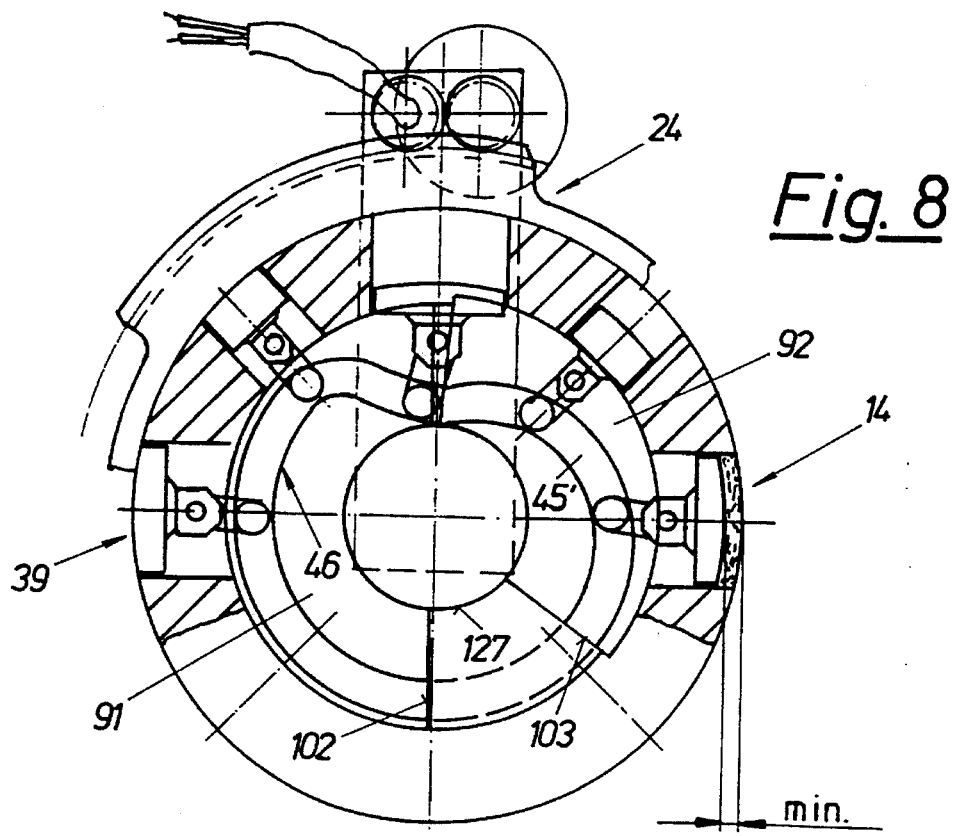

The FIGS. 7 and 8 show a restricted guidance composed of two elements according to FIGS. 3 to 6, in two different adjustment positions.

Figure 9:
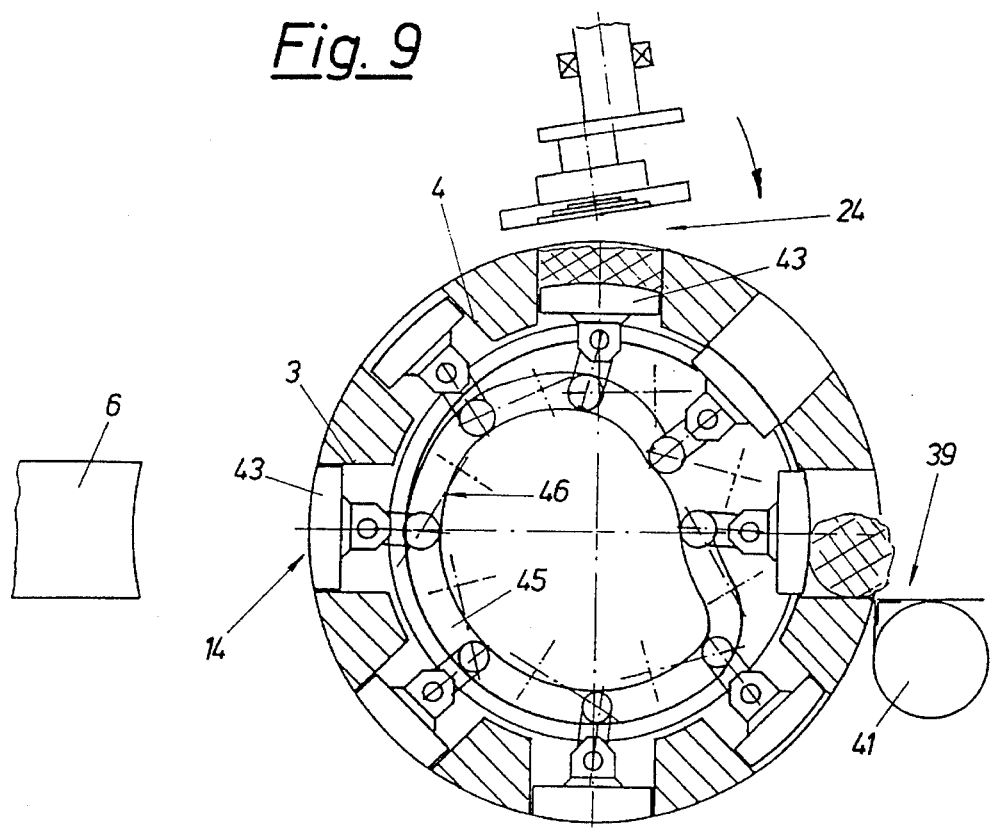
Figure 10:
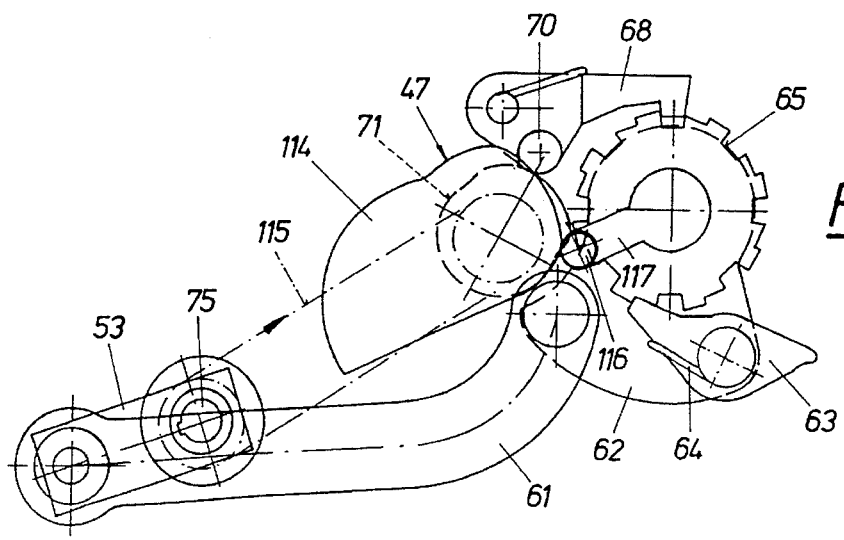
Figure 11:
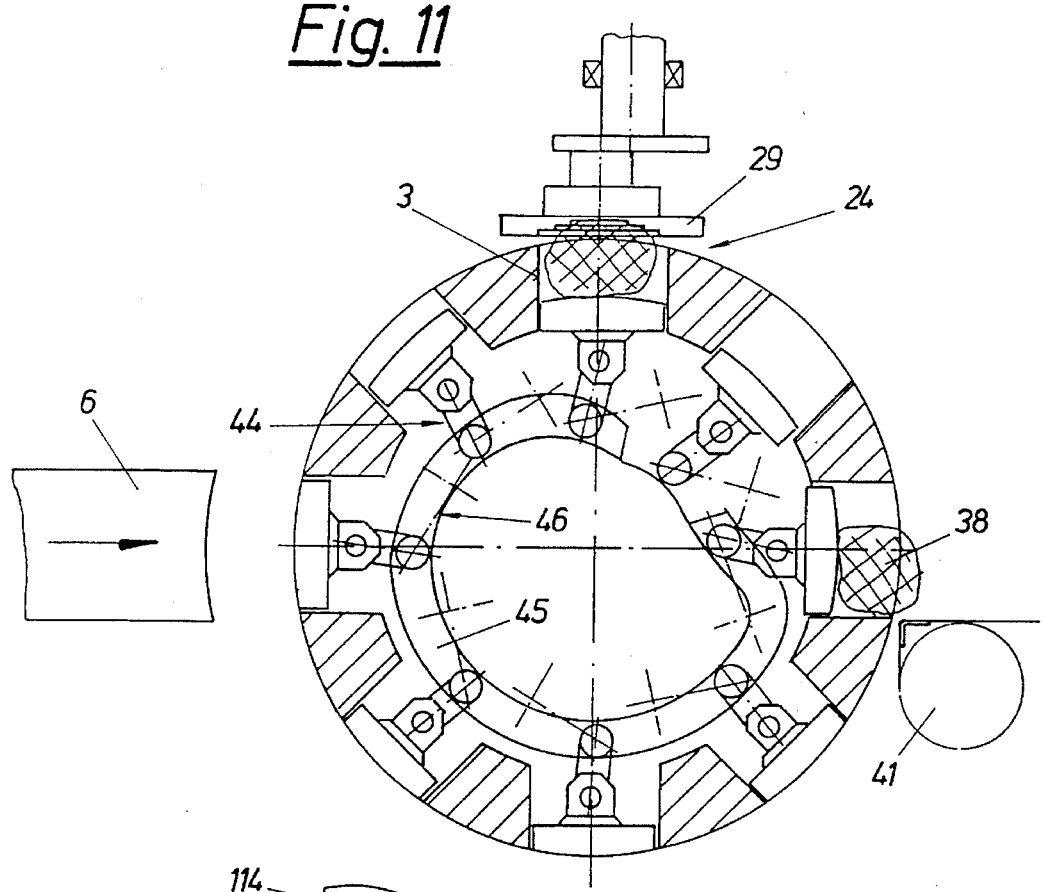
Figure 12:
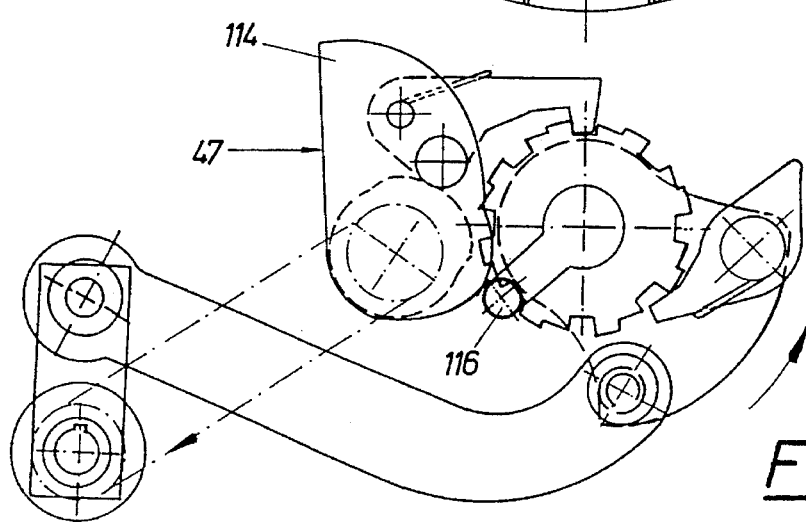
Figure 13:
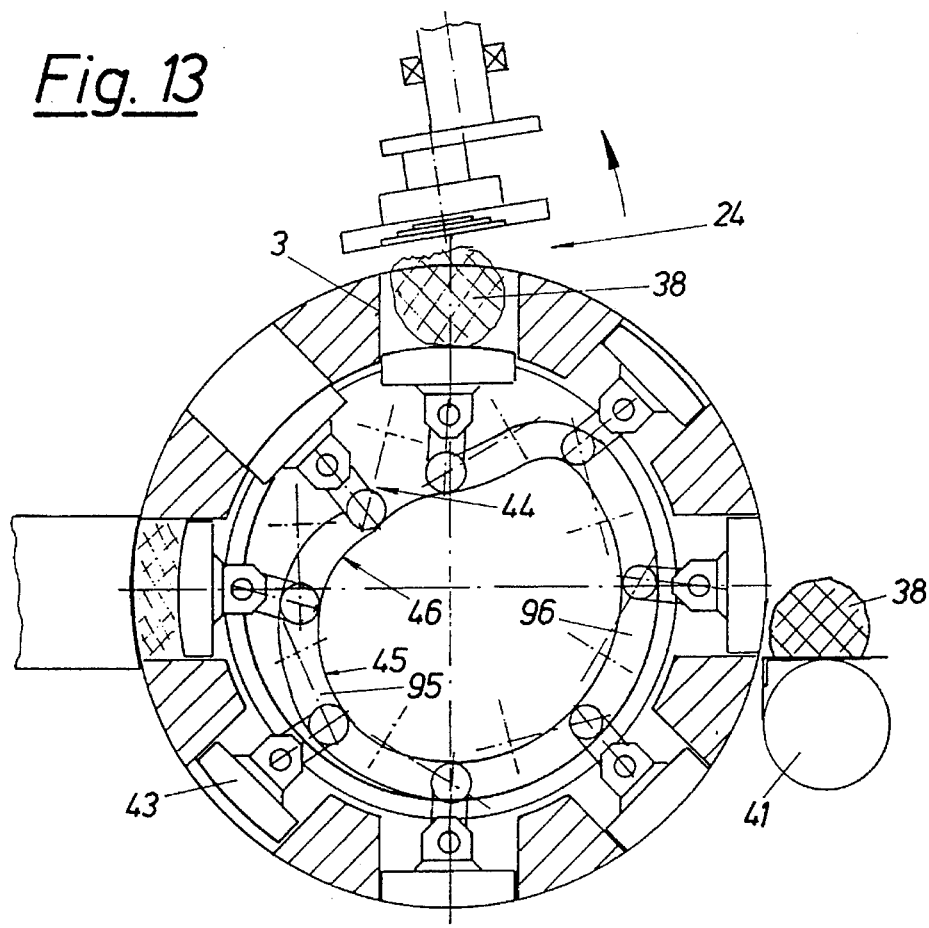
Figure 14:
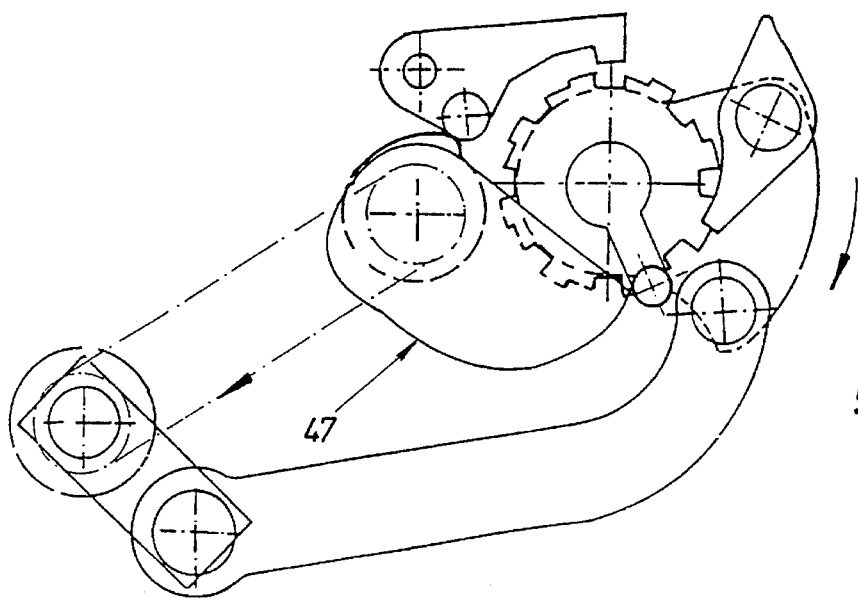

FIGS. 9, 11 and 13 show the restricted guidance in three subsequent phases of the kneading process and FIGS. 10, 12 and 14 show the associated drive means in the three corresponding moments of operation.

Figure 15:
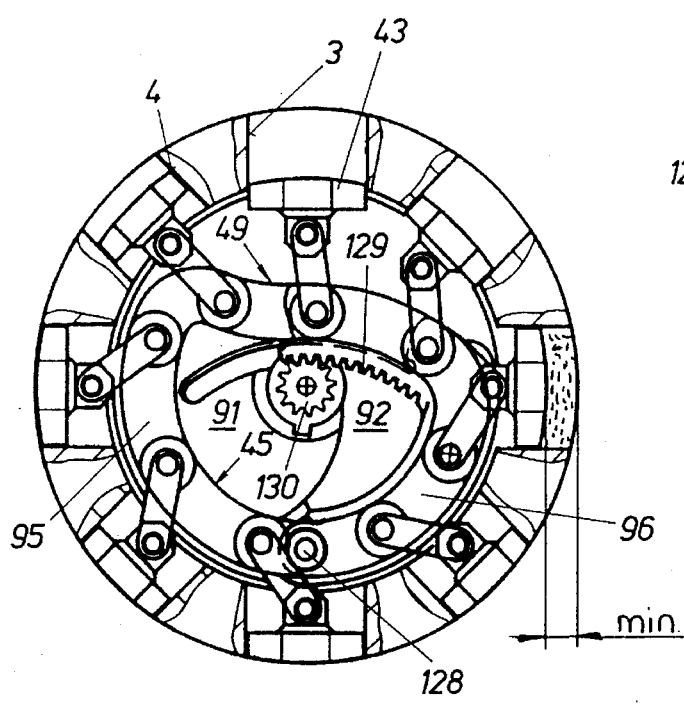
Figure 17:
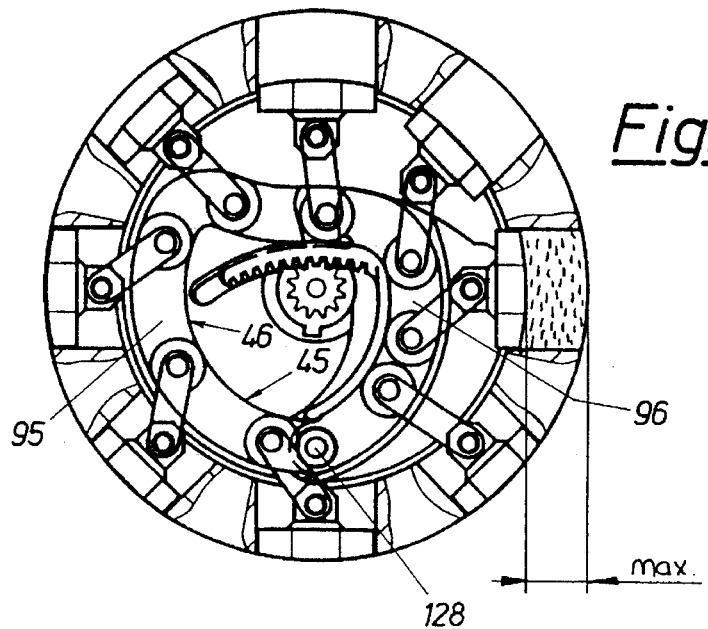

FIGS. 15 and 17 show a variated embodiment of a two-part restricted guidance.

Figure 18:
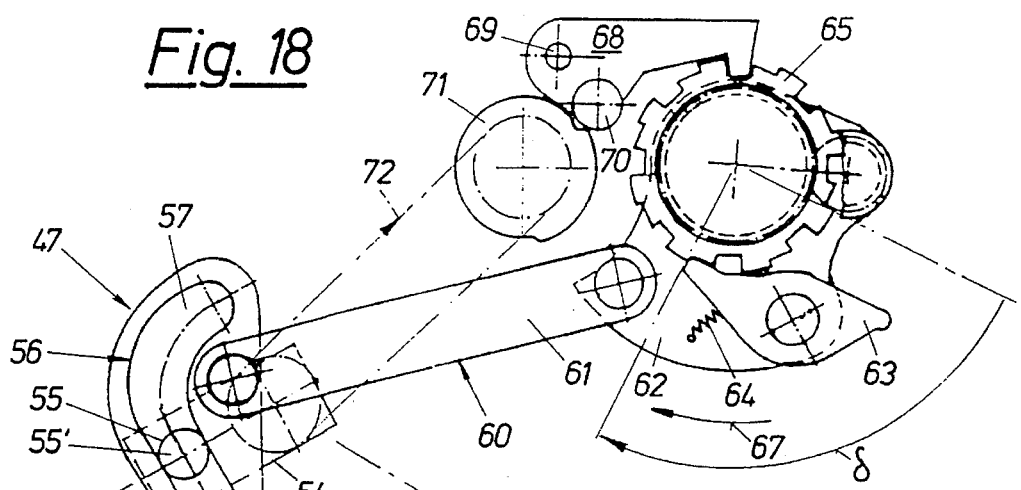

FIG. 18 shows a detail of FIG. 15 in section.

Figure 19:
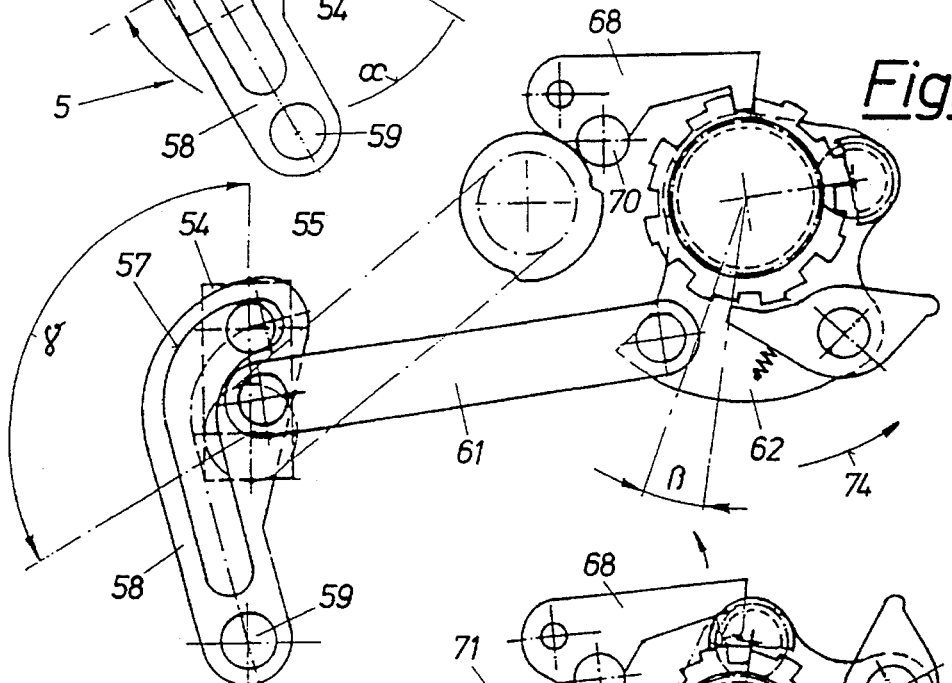
Figure 20:
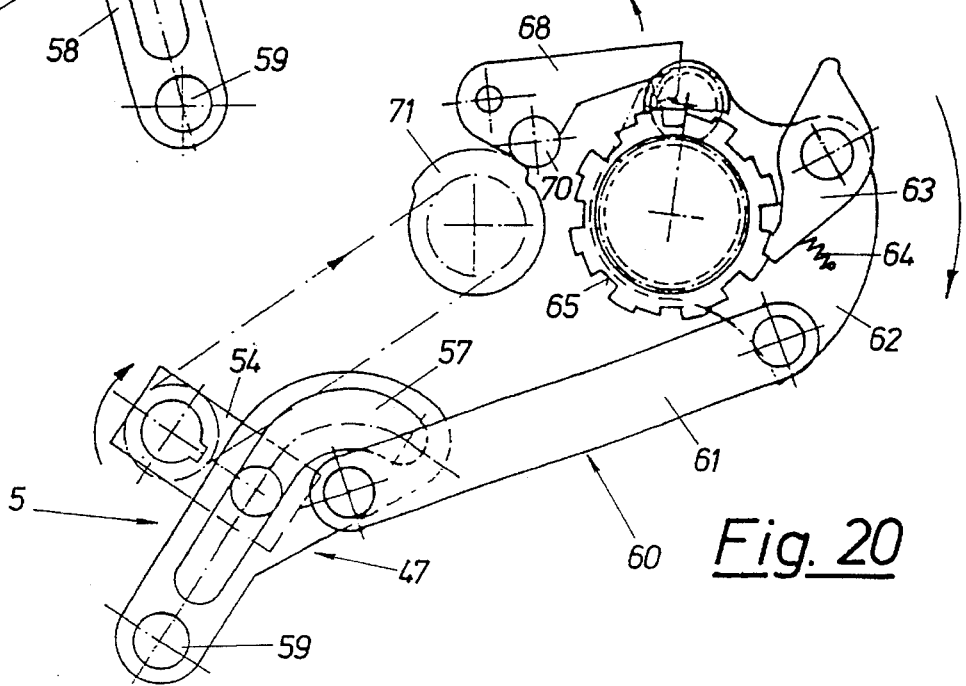

FIGS. 18 to 20 show variants of embodiments to FIGS. 10, 12 and 14.

Figure 21:
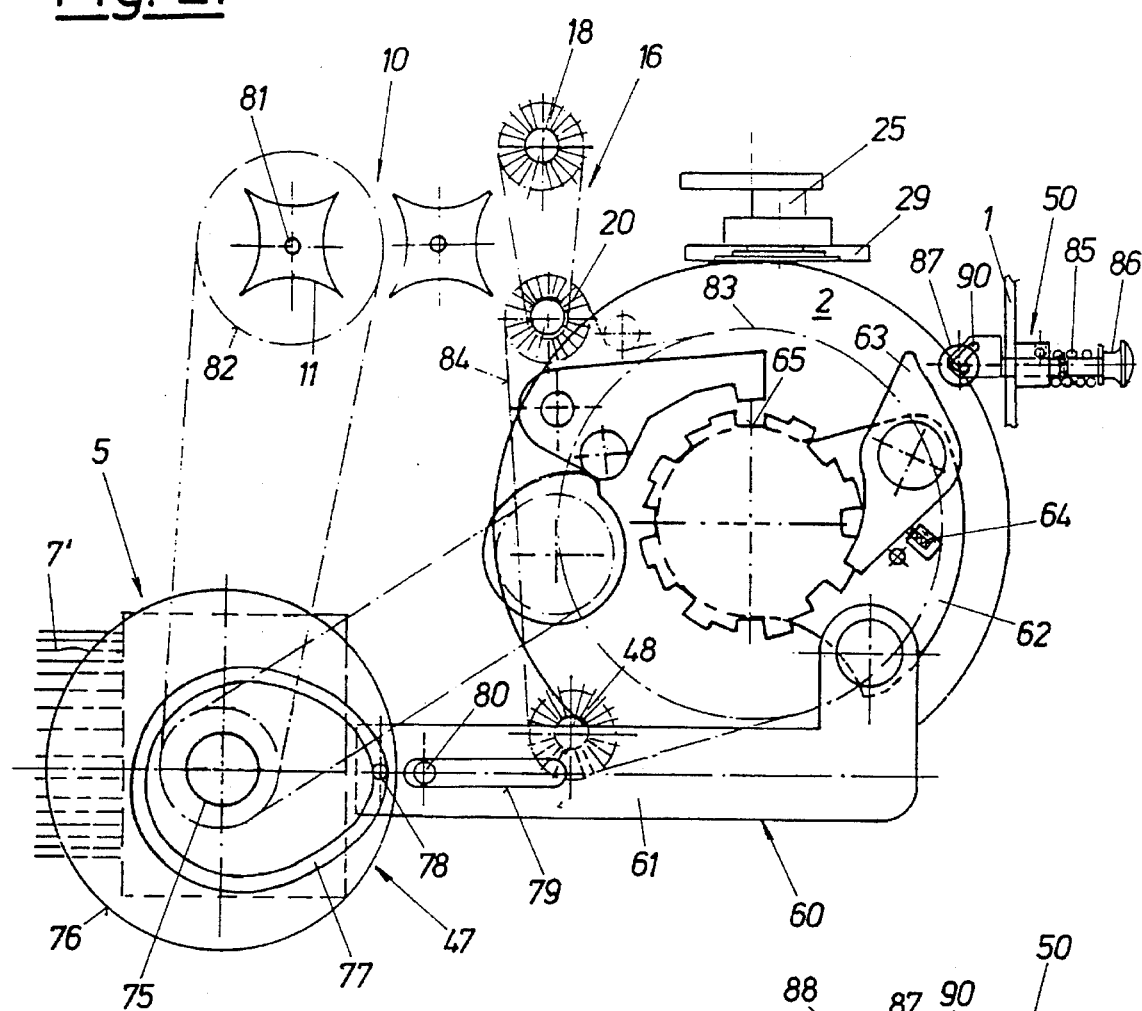

FIG. 21 shows a view of an amended embodiment in its substantial elements and

Figure 22:
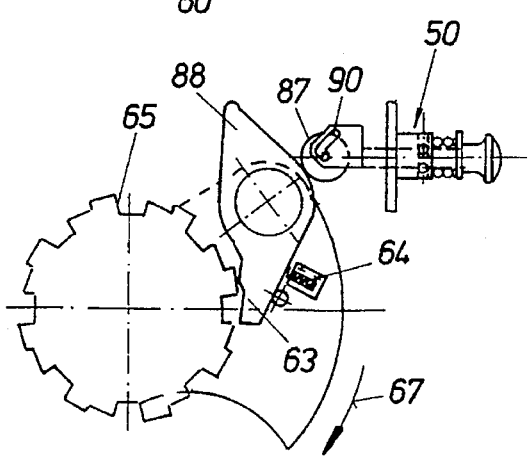

FIG. 22 shows a detail of FIG. 21 in another position of operation.

DETAILED DESCRIPTION OF THE PREFERRED EMBODIMENT

Figure 1:
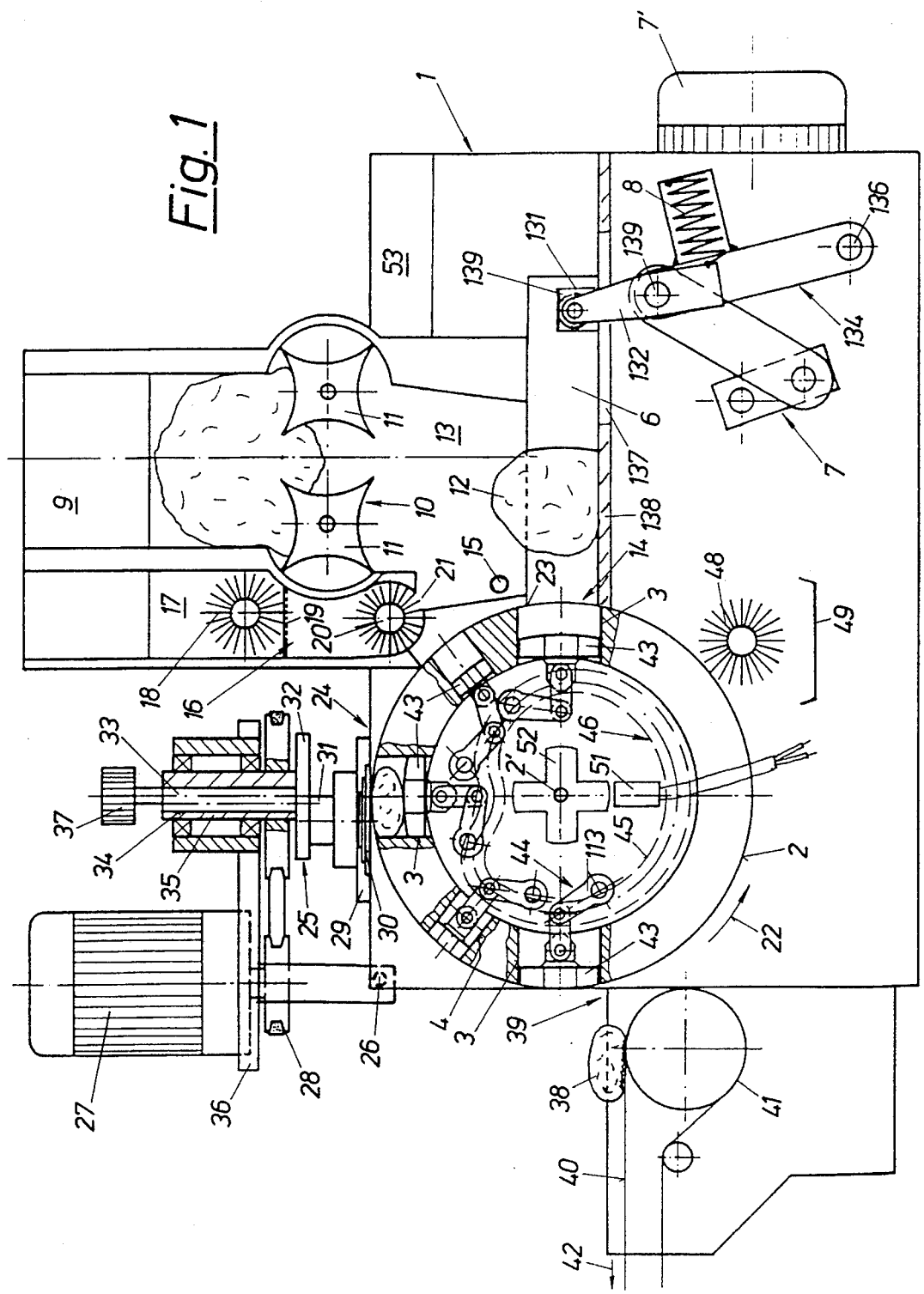
FIG. 1 shows a vertical section through the apparatus.

Within the embodiment according to FIG. 1, a drum 2 is bearingly supported for rotation around a horizontal axis 2' in a framework 1. The drum 2 has on its circumference receiving openings 3 or 4, respectively, of different size for the dough to be kneaded, the larger receiving openings 3 being distributed alternatively with the smaller receiving openings 4 over the periphery of the drum 2 in equal distances. Suitably these receiving openings are provided in rows extending parallel to the axis 2' of the drum. The drum is stepwisely driven by a drive means 5 (FIGS. 2, 18 to 20) so that at each step of the drum motion always one receiving opening 3 or 4, respectively, reaches a portioning station 14, at which the dough is pressed into the corresponding receiving opening by means of a press-in tool 6' formed by a pusher member 6. The pusher member 6 is reciprocably guided in the framework 1 in a guidance 379 (FIGS. 1, 28, 29) and is reciprocably moved by a crank mechanism 7 driven by the main motor 7'. A tension spring 8 is inserted into the crank mechanism 7 and avoids that the dough is unduly squeezed at the advance movement of the pusher member 6. The dough to be portioned is filled into a filling shaft 9 and is pre-portioned by a pre-portioning device 10 consisting of pre-portioning means 11' in form of two star rollers 11 positioned at the same level within the filling shaft 9 and rotating in inverse sense around horizontal axes and driven intermittently in dependence from the dough volume 12 provided within a chamber 13 positioned below the star rollers 11, from which chamber the dough 12 is pressed-in by the pusher member 6 and thereby is displaced in the chamber 13. If sufficient dough is at disposal within the chamber 13, a sensor 15 is actuated during this dough displacement, which sensor transmits a pulse to a control means for driving the star rollers 11. For example, this sensor may be formed by a photo-electric barrier or by a proximity sensor sensitive to the approach of moist mass, for example a capacitive sensor, or by a rod bearingly supported for swivel motion in the chamber 13 above the path of movement of the pusher member 6, which rod is lifted by the displaced dough. If there are no pulses transmitted by the sensor 15—if desired for a adjustable number of strokes of the pusher member 6—then causes the control means that dough is supplied into the chamber 13 by the star rollers 11 either for a selected time or till the sensor 15 is actuated again.

The dough volume 12 present in the chamber 13 is floured at its pressed-in side by flouring device 16. For this, a dosing brush rotates in a flour chamber 17 and throws flour through a dosing grid 19 having adjustable grid openings onto a distributing brush 20 that throws the flour through an opening 21 into the chamber 13. The drive means for this flouring device 16, in particular for its dosing brush 18, may be controlled in the same manner by the sensor 15 as the drive means for the pre-portioning device 10.

The dough pressed into the respective receiving opening 3 or 4 is sheared off by a shearing edge 23 when the drum 2 rotates again in direction of the arrow 22, and thereby the real portioning is done. After a rotation of the drum 2 for 90°, the dough piece present in the receiving opening reaches a kneading station 24 positioned in the region of the upper drum summit. There, a kneading device 25 is provided on the framework 1 and is driven by a motor 27 via a V-belt drive 28, the kneading device comprising a kneading tool 29 in form of a plate that at the kneading process moves in a circular motion relative to the neighbouring receiving opening and is provided on its side facing the drum 2 with stepwisely formed cavities 30 (see also FIGS. 23 to 26). The kneading tool 29 is bearingly supported for rotation on an eccentric pin 31 fixed to a disk 32 provided on the lower end of a second eccentric pin 33. This further eccentric pin is rotatably inserted into a seat 34 formed by an eccentric bore of a driving shaft 35 driven by the V-belt drive 28 and bearingly supported in a fixing device 36 carrying also the motor 27 and being fixed for pivotal motion around an axis 26 on the framework 1, so that the kneading device 25 can be swivelled off from the framework 1 for cleaning purposes or the like. The second eccentric pin 33 can be rotated within the driving shaft and can be fixed in its rotation position and carries on its upper end a tiller 37 for fixable adjustment. Thereby, the radius of the circular movement of the kneading tool 29 can be varied also during operation so that the kneading effect can be adjusted to the present circumstances, in particular to the size and the quality of the dough piece. This will be described more in detail.

The completely kneaded dough pieces 38 are ejected from the receiving openings 3 or, respectively, 4 at a deposit station 39 and are placed onto a conveyor belt 40 that is guided around a deflection roller 41 disposed near the drum 2. In order to ensure a reliable transition of the dough piece 38 to be ejected, the conveyor belt 40 may be prematurely driven, that means, it starts its motion in direction of the arrow 42 before the dough piece is ejected. This ejection is caused by a radial outward movement of a piston 43 guided in each one of the receiving openings 3, 4. All pistons 43 are guided along a curved path 45 of a restricted guidance 46 by linkage means 44 so that a rotation of this curved path 45 with respect to the drum 2 causes a radial movement of the piston 43 in the respective receiving opening, either inwardly or outwardly. This relative rotation is made by a drive means 47 described later on in detail. The curved path 45 is substantially so formed that, when the curved path 45 makes its relative rotation during the intervals of motion of the stepwise drum motion, the pistons 43 are retracted at the portioning station 14 in order to produce a suction effect onto the dough to be portioned. At the kneading station 24, the piston 43 is further retracted in order to provide more space for the dough piece that little by little assumes a ball-like shape by the kneading process. At the deposit station 39, however, the pistons 43 are shifted outwardly until the periphery of the drum and thereby the dough pieces 38 are ejected from the receiving openings 3 or 4.

If necessary, rests of dough adhering on the drum are stripped off by a cleaning brush 48 and are thrown onto a collecting cup 49.

Always one single size of the receiving openings 3 or, respectively, 4 is effective. In order to change from the large receiving openings 3 to the small receiving openings 4 or vice versa, a change-over device 50 (FIGS. 21, 22) is provided, the function thereof is nearer described later on. The respective adjusted size of the openings can be sensed by a sensor means 51 (FIG. 1) cooperating with a transmitter cross 52 fixed on the shaft of the drum and associated to the larger receiving openings 3. If the sensor means 51 during the motion interval of the drum 2 senses a neighbouring protrusion of the transmitter cross 52, the larger receiving openings 3 are effective, otherwise the smaller receiving openings 4. The evaluation of the signals transmitted by the sensor 51 can be made by electronic means positioned in a switch box 53, in the same way as the control of the drive means of the pre-portioning device 10 and, respectively, or of the flouring device 16.

It is convenient to make the length of time at disposal for the kneading process of each dough piece 38 at the kneading station 24 longer than that length of time that is required for an advance step of the drum 2, that means, for example, to bring a receiving opening 3 or 4 from the portioning station 14 to the kneading station 24 or, respectively, from this to the deposit station 39. For this, the FIGS. 18 to 20 show suitable drive means 5 for the drum or, respectively, 47 for the restricted guidance 46. By the main motor 7' (FIG. 1) a crank 54 is rotated via a gear means, which crank carries a rotatable roller 55' bearing supported on a pin 55 and guided in a curved slot 57, forming a curved path 56, of a swivelling lever 58 bearingly supported in the framework 1 of the apparatus for swivel motion around a horizontal axis 58 and forming a member of a linkage means 60 serving for the motion of the drum 2 or, respectively, of the restricted guidance 46. This linkage means 60 has a rod 61, the one end of which is hinged to the swivelling lever 58 and the other end of which is hinged to a rocker arm 62 rotatably mounted on the shaft of the drum 2 and connected for rotation with the restricted guidance 46, for example by means of a shaft intersecting hollow shaft ends of the drum 2 that are connected to the two side walls of the drum 2. The rocker arm 62 carries a catch 63 pressed by a spring 64 against a row of notches 65, particularly a notched collar connected for rotation with the shaft 66 of the drum 2. During the advance movement of the drum 2 the rocker arm 62 is pivoted via the drive means 5 in direction of the arrow 67 (FIG. 3) and the catch 63 engages a notch of the row of notches 65 and thereby the drum 2 is carried along. During the intervals of motion of the stepwise drum motion, a further catch 68 bearingly supported for pivotal motion around an axis 69 in the framework 1, engages a notch of a row of notches 65 and thereby prevents the drum 2 from rotation. The catch 68 carries a roller 70 bearingly supported for rotation on the catch and guided along the periphery of a cam disk 71 that is rotated by the main motor 7' via a chain drive 72. The shape of the periphery of the cam disk 71 determines when the catch 68 is lifted out of the row of notches 65 and thereby makes the drum 2 free for rotation.

The drive means 451 for the rotation of the restricted guidance 46 (FIG. 2) disposed on the side of the drum 2 and serving for adjustment of the pistons 43, is also driven by the main motor 7' via the crank 54 (FIGS. 18 to 20) and utilizes also the linkage means 60. For this, a shaft carrying the restricted guidance 46 and for simplification's sake is assumed to be a single shaft, is connected for rotation with the rocker arm 62. Each pivotal movement of the rocker arm 62, may it be during the advance of the drum in direction of the arrow 22 (FIG. 1) or during the interval of motion of the drum in the inverse direction, therefore causes a corresponding swivel motion of the restricted guidance 46 around the axis of this shaft.

The circumstances, in particular the shape of the curved slot 57 in the swivelling lever 58, are so chosen that shorter periods of time result for the movement of the drum (advancement from station to station) than for the rotation of the restricted guidance 46 during the stillstand of the drum 2. Since the drive means 5, 47 are positioned on the other side of the drum 2 as the view side of FIG. 1, the positions of the members shown in FIGS. 18 to 20 are side-inverted, so that the portioning station 14 is disposed at the left side and the deposit station 39 at the right side. FIGS. 9, 11 and 13 are correlated to FIGS. 18 to 20 and clearly show the relative position of drum 2 and restricted guidance 46 as well as the movement of the pistons 43 caused thereby.

FIGS. 18 and 9 show the circumstances before the start of the kneading process. It can be seen that during an angle of rotation α of the crank 54 of about 120° the drum 2 is advanced for 90° and this by an harmonic acceleration without bump, and also harmonic decelerating. The piston 43 positioned at the kneading station 24 (FIG. 9) assumes a middle position, corresponding to the volume of dough portioned at the portioning station 14. As soon as the advancement of the drum 2 is terminated, the cam disk 71 allows the catch 68 to rest into the row of notches 65, whereby the drum 2 is blocked against rotation. Now the kneading process starts at the further rotation of the crank 54 (FIGS. 11, 19). Thereby the rod 61 is shifted to the right (FIG. 19) and swivels the rocker arm 62 in direction of the arrow 74, however at the beginning for a small amount only (angle β) although the crank 54 rotates during this time for a substantially greater angle δ which again amounts to about 120°. This relative small swivel motion of the rocker arm 62 causes an also small rotation of the restricted guidance 46, whereby the piston 43 positioned at the kneading station 24 at the Start of the kneading process is retracted for a comparatively small amount in its receiving opening 3. For this initial phase of the kneading process, therefore, about one third of the total time period of the cycle is at disposal or about as much time as for the advance of the drum (angle α, FIG. 18).

The shape of the slot 57 in the swivelling lever 58 is coordinated with the shape of the curved path 45 of the restricted guidance 46, so that the speed of retraction of the pistons 43 necessary at the kneading station 24 has the desired amount.

During further rotation of the crank 54 (FIGS. 13, 20), following the angle δ (FIG. 19) there is an accelerated swivel motion of the rocker arm 62 and therefore a quicker rotation of the restricted guidance 46, what causes a quicker retraction of the piston 43 in its receiving opening 3 or 4 in the end phase of the kneading process. FIGS. 13 and 20 show the circumstances after termination of the kneading process when the catch 68 is lifted off by the cam disk 71 so that the drum 2 is made free for rotation in direction of the arrow 22. The drum is advanced for 90° (angle δ in FIG. 18) and the cycle is started again.

As it is shown in FIGS. 18 to 20, the shortened relation between the time for movement of the drum and the kneading time is represented by the shape of the cam disk 71. Its elevated cam portion that causes the catch 68 to swivel off during the advancement of the drum, extends only over about a third of the periphery of the cam disk 71, whereas two thirds of this periphery correspond to the time that is at disposal for the kneading process.

A variant thereto is shown in FIGS. 21 and 22. The driven shaft 75 of the motor 7' carries as disk 76 on which an endless curved loop 77 is fixed in which a pin 78 is guided that is mounted on the rod 61 of the linkage means 60 by which the drive means 5, 47 for the drum 2 or, respectively, for the restricted guidance 46 are connected to the rocker arm 62. The rod 61 has a slot 79 into which a pin 80 engages that is fixed to the framework 1 and carries the rod 61 for pivotable and shiftable motion. By the eccentric arrangement of the curved loop 77 with respect to the output shaft 75, analogously the same effects are obtained as this has been described with respect to FIGS. 18 to 20.

FIG. 21 shows also the drive means for the pre-portioning device 10 and for the flouring device 16. As chain wheel is mounted on the output shaft 75 and drives via a chain a chain wheel 82 mounted on the shaft 81 of the one star roller 11. This chain wheel 82 is coupled by a magnetic coupling to the shaft 81, which coupling is controlled by the sensor 15 (FIG. 1) or, respectively, via the electronic means disposed within the switch box 53 in the manner described. The two star rollers 11 are coupled to each other by means of pinions so that they rotate synchronously having opposite senses of rotation.

For the flouring device 16, the drive is derived from a chain wheel 83 that is mounted on the shaft of the drum 2 and drives via a chain 84 as well the flouring device 16, and, more particularly, its lower distributing brush 20, as the cleaning roller 48. The two brush rollers 18, 20 of the flouring device 16 are coupled to each other by a chain drive, the chain wheel associated to the dosing roller 18 being connected via a magnetic coupling to the shaft associated to this dosing brush 20. Also this magnetic coupling may be controlled by the sensor means 15, if desired with an adjustable delay time or, respectively, via the electronic means positioned within the switch box 53.

The change-over device 50 for changing over from the smaller receiving openings 4 to the larger receiving openings 3 or, respectively, vice versa, comprises a push-button 86 shiftably guided in the framework 1 against the action of a spring 85, which push-button carries on its inner end a roller 87 cooperating with the catch 63 mounted for swivel motion on the rocker arm 62. If a change-over is desired, the push-button is pressed in the position shown in FIG. 22 against the action of the spring 85 so that during the advance movement of the drum (arrow 67) the roller 87 engages the catch 63 and thereby lifts off this catch against the action of the spring 84. Thereby, any carrying along of the drum 2 during the swivel motion of the rocker arm 62 in direction of the arrow 87 is interrupted so long until a nose 88 engages the roller 87 and thereby presses the push-button 86 out of a ball stop notch 89 so that the push-button is moved back into its starting position (FIG. 21) under the action of the spring 85. Then, the catch 63 engages in the next following notch of the row of notches 65 under the action of the spring 64.

If the push-button 86 is actuated during a relative swivel between the restricted guidance 46 and the drum 2, so that the rocker arm 62 is swivelled opposite to the direction of the arrow 67, then the nose 88 of the catch 63 presses the roller 87 back along a guidance 90 so that the roller 87 can get out of the way. As soon as the advance of the drum starts, the roller 87 slides again in the guidance 90 downwardly into the position shown in FIG. 21 and, therefore becomes effective, as described above.

In order to make it possible to change the restricted guidance 46 on a treating station for the dough pieces 38, for example on the portioning station 14 in order to change the weight of the dough pieces, without that this change influences the circumstances at the kneading station 24 or at the deposit station 39, each restricted guidance 46 consists of at least two members that are adjustable relative to each other. For simplification's sake, the examplative embodiments shown in the drawing show only two such members 91, 92 (FIGS. 2 to 8 and 16, 17), however, also three or more such members may be provided. In the embodiment according to FIGS. 2 to 8, the two members 91, 92 can be swivelled around a common center 93 which coincides with the axis 94 (FIG. 2) of the drum 2. Each one of the two members 91, 92 carries a section 95 or, respectively, 96 of the curved path, which two sections complete each other in each relative swivel position of the two members 91, 92 so that all pistons 43 are always reliably guided in radial direction and, therefore, cannot escape neither outwardly nor inwardly. As a rule, the two members 91, 92 overlap each other partially (FIG. 2), the amount of this overlapping is determined by the relative swivel of the two members. The said possibility for variation is obtained by the fact that on the member 91 (FIGS. 3, 4) the section 95 of the curved path 45 has an enlargement 97, which section would allow an oscillation of the pistons 43 if it would be important alone for guiding the pistons 43. However, this oscillation is avoided by the fact, that this enlargement 97 is overlapped by the section 96 of the curved path 45 of the member 92 (FIGS. 5, 6), so that this section becomes of importance for the restricted guidance of the pistons 43. In an analogous manner, the section 96 of the member 92 acts as a guidance for the pistons 43 in that section 98 of the member 91, in which the curved path 45 is interrupted. In at least one section of the curved path 45, it is limited also by both member 91, 92, and this in a sector 99 which constitutes that part of the sector 98 that corresponds to the end of the curved path 45 in the member 91 that merges into the sector 98 and is not enlarged. There, the curved path 45 is confined on its outer side by a peripheral fin 100 of the member 91, which fin is positioned on the outer side of the sector 98. On the inner side, the confinement is constituted by a plate-shaped section 191 of the member 92, which section has a spiral-shaped periphery. The relative rotation of the two members 91, 92 is limited by stops 102, 102' of the member 51 or, respectively, 103, 103' of the member 92. In that position of the two members 91, 92 in which the stops 102, 103 engage each other, also the front end 104 of the section 101 (FIG. 5) engages a lateral surface 105 of a thickening of the member 91. The angle for which the two members 91, 92 can be swivelled relative to each other, amounts approximately to 50°, however, if desired, it can be made greater without any problem, if this is desired with respect to the present requirements.

In order to rotate the two members 91, 92 constituting the restricted guidance 46 for the pistons 43, also relative to each other, the two members 91, 92 are fixed to concentric shafts 107, 108 (FIG. 2), from which the shaft 107 is a hollow shaft guiding the shaft 108. The linkage means 44 (FIGS. 1, 2) moving the pistons 43 is guided in the restricted guidance 46 of the two members 91, 92, and for this a roller 109 runs in the curved path 45 which roller is bearingly supported for rotation on the one end of a swivel lever 110 (FIG. 2), the other end of which is rigidly mounted on a shaft 111 bearingly supported for rotation in the two side walls 112 of the drum 2. For each piston 43, the shaft 111 carries a swivel arm 113, the free end of which is hinged by a hinge member 114 to the inner end of the piston 43.

Figure 2:
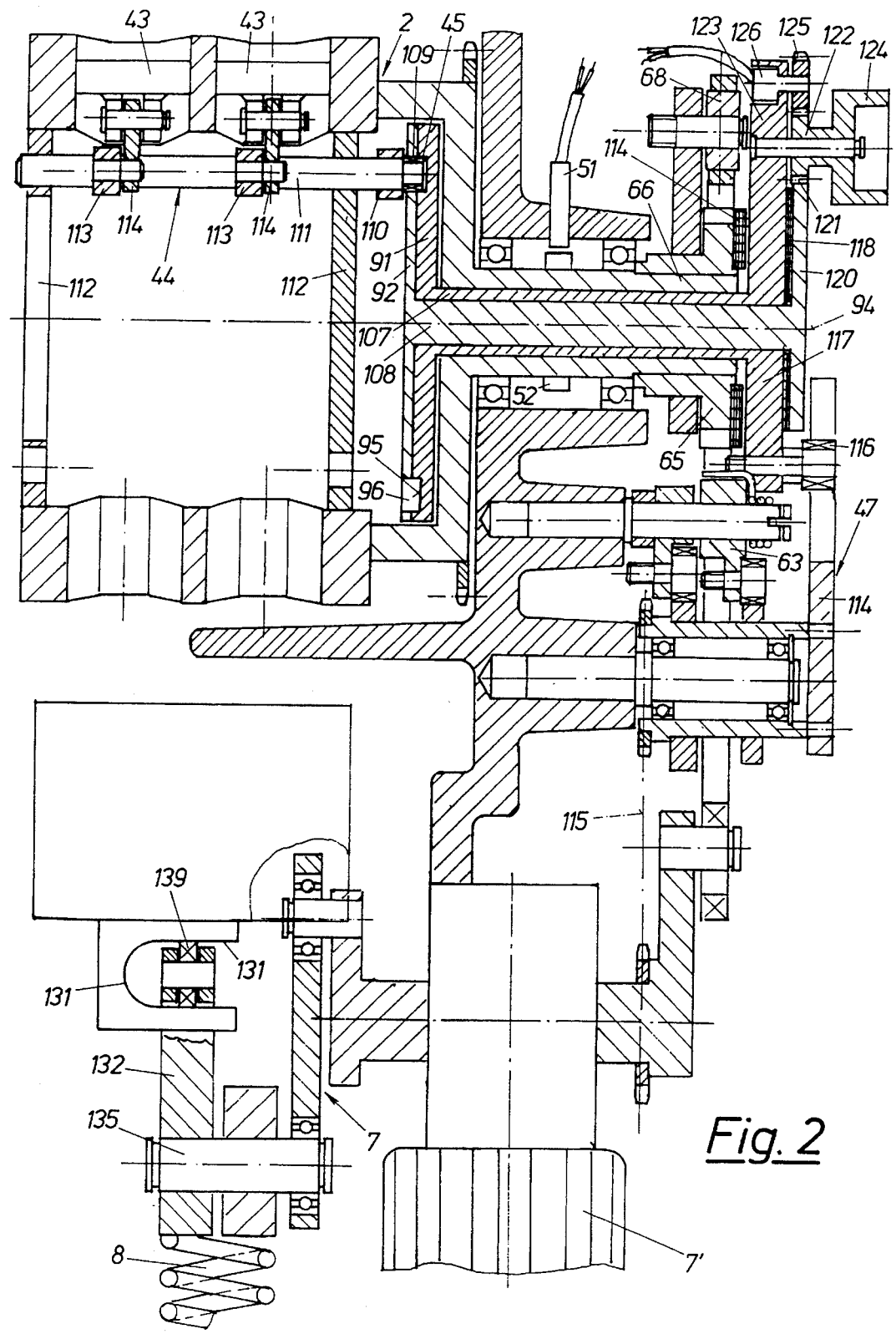
FIG. 2 is a vertical section through the axis of the drum, in a larger scale, taken perpendicularly to the section plane of FIG. 1.
Figure 6:
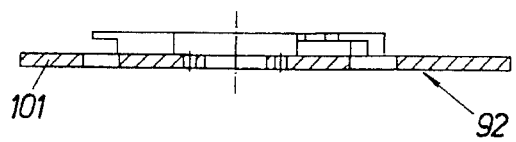
FIGS. 4 and 6 are sections along the lines IV—IV or VI—VI of FIGS. 3 or 5.
Figure 5:
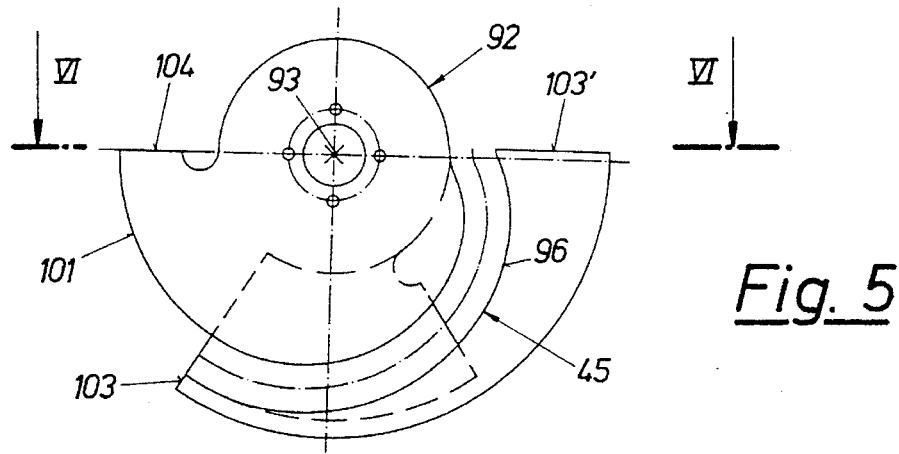
FIGS. 3 and 5 show the two members of a two-part restricted guidance, in axial view.
Figure 4:
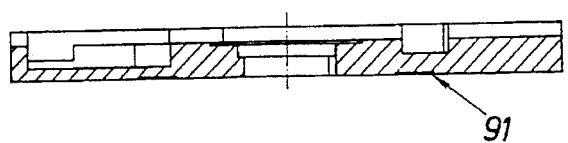
Figure 3:
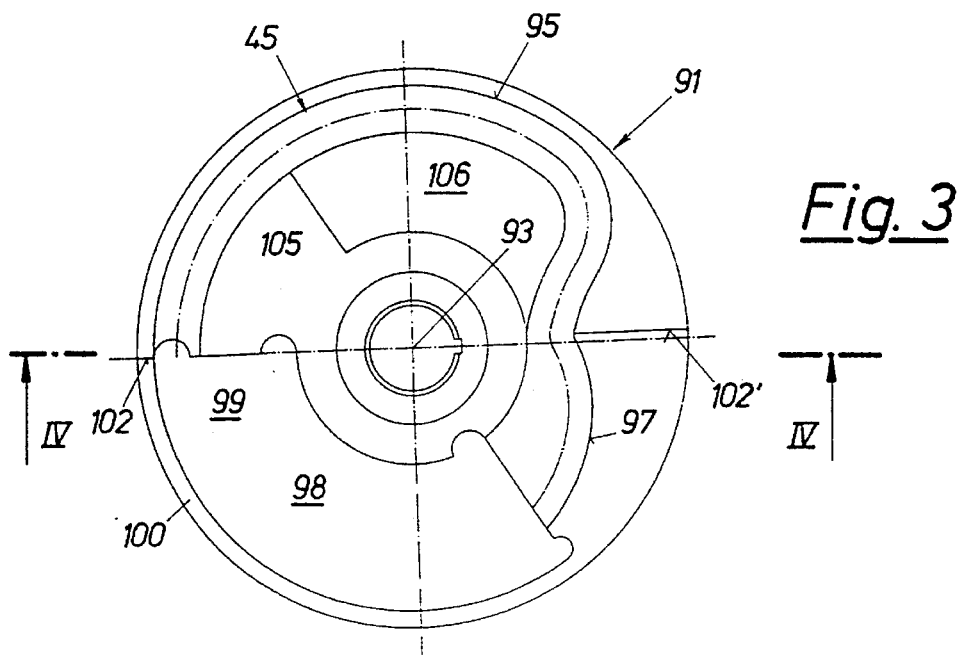

The two shafts 107, 108 extend concentrically in the shaft 66 of the drum (FIG. 2) outwardly and are there effectively connected to the drive means 47. For this, the drive means 47 can be so constructed as this is shown in FIGS. 18 to 20, however, also the embodiment according to FIGS. 9 to 14 may be chosen. This embodiment, however, has not the advantage that the time durations for the advance of the drum and for the kneading process may be chosen differently. As within the embodiment according to FIGS. 18 to 20, for the advance of the drum the output shaft 75 of the motor 7' acts via a crank 54 and a rod 61 hinged thereto on the rocker arm 62 that takes along the drum by means of the spring-loaded catch 63 when the drum ist advanced. Within this, the cam disk 71 keeps the spring-loaded catch 68 out of an engagement with the row of notches 65 so that the drum 2 can be rotated. As soon as the advance of the drum terminated, the roller 70 of the catch 68 slides off the cam disk 71, the catch 68 engages into the row of notches 65 and the drum 2 is blocked. During the stillstand of the drum 2 the two members 91, 92 constituting the restricted guided 46 are rotated in common, whereby the pistons 43 are advanced or, respectively, retracted at the single stations. The rotation of the two members 91, 92 may be made by the rocker arm 62, as this is shown in FIGS. 18 to 20, however, within the variant of the construction according to FIGS. 2 to 14, for this purpose a further cam disk 114 of the drive means 47 is provided that is positioned outwardly and is continuously driven via a chain drive 15 by the output shaft 75 of the motor 7'. This cam disk 114 may be positioned on the same shaft as the cam disk 71 and acts with its periphery on a roller 116 bearingly supported on a lever 117 that is rigidly connected with the hollow shaft 107 of the restrictive guidance member 91 (FIG. 2). A friction lining 118 takes along a disk 119 that is positioned on the outer side and connected to the shaft 108 of the restrictive guidance member 92. The backward rotation of the members 91, 92 is braked by a brake lining 119 which is positioned on the member that stillstands during this backward rotation and plays the roll of a ratched wheel carrying the row of notches 65. The end of the swivel motion of the lever 117 is shown in FIG. 14. At this moment, the cam disk 114 slides off the roller 116 and the backward motion of the lever 117 into the starting position shown in FIG. 10 starts under the action of the advance movement of the drum 2, because via the brake lining 119 and the friction lining 118 also the members 91, 92 and, therefore, the lever 117 are taken along, when the row of notches 65 is rotated for the advance of the drum 2.

By the shape of the periphery of the cam disk 114, the angular velocity of rotation of the restricted guidance 46 for the pistons 43 can be influenced at choice, so that always optimal kneading conditions are ensured.

An additional catching of the disk 120 by the lever 117 during the phases of weighing, kneading and deposition can be obtained by means of a pinion 122 meshing with a toothed ring 121 of the disk 120, which pinion is bearingly supported for rotation on an extension 123 of the lever 117 and carries a handwheel 124 for adjustment. This pinion 122 meshes with a further pinion 125 that is bearingly supported on the extension 123 and adjusts a potentiometer 126 on which the measured weight adjusted by means of the handwheel 124 is indicated by means of a display (see also FIGS. 7, 8).

In the FIGS. 7 and 8 it is shown how by rotation of the one member 92 forming the restricted guidance 46, the conditions at the portioning station 14 with respect to the volume of the dough pieces to be portioned there, can be changed between a maximum (FIG. 7) and a minimum (FIG. 8), without that this change influences the conditions at the kneading station 24 and at the deposit station 39. The possibility of a stepless change of the portioned dough volume is obtained by the spiral-like shape of a section 45' of the curved path 45 in the member 92, which section 45' extends from the outer periphery of the member 92 up to a central hub 127 thereof.

Figure 16:
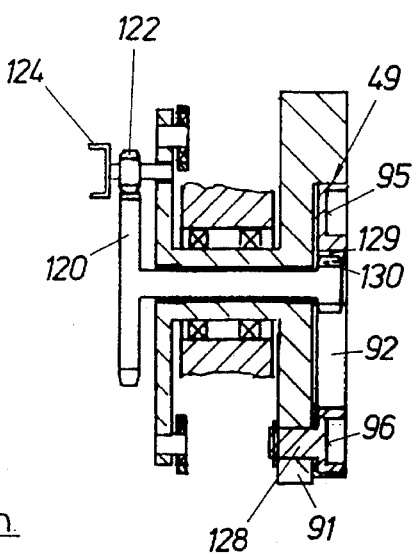

FIGS. 15 to 17 show an embodiment variant for the construction of members 91, 92 constituting the restrictive guidance 46 and being movable relative to each other. The curved path 45 which here has been shown excessively strong for clarification's sake, extends in two members 91, 92, both of them having substantially the shape of a section of a circle and being connected to each other in the region of the periphery by means of a hinge 128. Here, the adjustment is not done by rotation of the two members 91, 92 relative to each other, as this was the case within the embodiment according to FIGS. 7 ant 8, but by a relative swivel of the two members 91, 92, and for this the one member 92 is provided with teeth 129 extending along an arc of a circle, the center of this arc of a circle being positioned in the axes of the hinge 128. These teeth 129 mesh with a pinion 130 bearingly supported on the other member 31 and rotatable from the outside, for example by means of the handwheel 124 (FIGS. 2, 16). As FIG. 16 shows, there is in this case a construction for the bedding of the two members 91, 92 of the cam disk that is somewhat modified with respect to FIG. 2, since the member 92 is taken along via the hinge 128 if the member 91 is rotated.

Of course, the construction shown is also applicable to such machines in which all receiving openings on the periphery of the drum 2 are of equal size. In this case, it is suitable to provide four rows of receiving openings displaced on the drum relative to each other for 90° respectively.

For facilitating the cleaning it is suitable, if the movable members being in contact with the dough in the filling shaft 9 and preferably also the cleaning brush 48 are dismountable from the framework 1 towards the same direction. For this, detachable or swivelable walls of the housing (not shown) are provided in the regions of these members (star rollers 11, brushes 18, 20 of the flouring device 16 and pusher member 6, as well as, if desired, the cleaning brush 48), after the removal thereof the rollers or, respectively, brushes or, respectively, the pusher member 6 can be pulled out of the housing. For this, it is suitable to connect the star rollers 11 as well as the brushes 18, 20, 48 to their driving shafts by means of detachable rapid couplings, in particular pin-and-socket connections, that permit a quick dismounting or, respectively, mounting again. For the pusher member 6 serves the following construction: The pusher member 6 has in the region of its rear end a recess 131 (FIGS. 1, 2) open to below, which is open also towards that side facing the direction opposite to that of dismounting the pusher member 6. In this recess 131 engages the upper part 132 of a rocker lever 134 comprising two parts 132, 133 connected to each other by a hinge 135, which rocker lever constitutes a member of the crank drive 7 and is bearingly supported in the housing 1 for swivel motion around a horizontal axis 136. To the member 133 the housing of the spring 8 is connected, the one end thereof is fixed to this housing, the other end to the lever part 132. This lever part 132 engages with its upper end the recess 131 from below through a slot 137 of the bottom wall 138 of the chamber 13 and carries a roller 139 contacting the wall of the recess 131. This enables one to pull out this pusher member 6 in direction perpendicularly to the plane of the drawing (FIG. 1) from the housing 1, or, respectively, to mount it again in the inverse direction, after detachment of the corresponding wall portion of the housing 1 which at the same time may constitute the lateral guide for the pusher member 6.

The invention is also applicable to such apparatus in which only a kneading process, but no portioning process takes place, since already portioned dough pieces are put into the receiving openings, for example by means of a supply conveyor belt. In this case, the invention ensures the advantages that the kneading conditions can be varied at choice without that this has any influence upon the conditions at the deposit station 39. On the last-named station it is of importance for safety's sake, that the pistons 43 always are flush with the periphery of the drum 2 so that one cannot grasp into the receiving openings 3 or, respectively, 4. Of course, this advantage can also obtained within the other, above mentioned kinds of the apparatus.

The principle according to the invention can be extended without any problem to more than two members constituting the restricted guidance 46, so that also complicated conditions of motion of the pistons 43 at the single treatment stations 14, 24, 39 can be taken into account. Of course, also at the lower peripheral portion of the drum 2 a further treatment station can be disposed, for example a station at which the empty receiving openings 3, 4 are cleaned and, respectively, or are oiled and, respectively, or are floured.

Also other kinds of apparatus are possible in which a treatment of the dough different from kneading or, respectively, portioning takes place, as long as within this kind of apparatus a movement of the piston in its receiving opening is of importance.

It is claimed:

1. Apparatus for the treatment of dough comprising:

a drum having a longitudinal axis, said drum being mounted for rotation around said axis, said drum including radially inwardly extending openings on an outer peripheral surface of the drum for receiving dough portions;

a first station for introducing dough portions into said openings;

a second station for treating the dough portions received in the openings;

a third station for ejecting the dough portions from the openings, said first, second and third stations being disposed near the periphery of the drum and further being spaced circumferentially around the periphery of the drum;

means for rotating the drum in stepwise increments;

a plurality of pistons, each respectively arranged for sliding radial movement within a corresponding one of said openings;

curved guide means associated with said plurality of pistons for positively guiding inward and outward radial movement of the pistons during at least one phase of treatment, said guide means being mounted for rotation around the axis of drum, said guide means having a predetermined starting rotational position, said guide means comprising at least two curved path sections carried on at least two cam members, said cam members being received in assembled relation such that said curved path sections cooperate to form said guide means, said cam members being adjustable relative to each other independently of their rotational motion;

means for rotating the guide means relative to the drum at least during phases when the drum is not being rotated, said means comprising at least two concentrically bearingly supported shafts respectively associated with said cam members;

adjustment means for adjusting the starting rotational position of the guide means; and adjustment means for adjusting rotational positions of said shafts relative to each other.

2. The apparatus of claim 1 wherein said first station comprises a portioning station.

3. The apparatus of claim 1 wherein said second station is a kneading station.

4. The apparatus of claim 1 wherein said shafts comprise hollow shafts.

5. The apparatus of claim 1 wherein said shafts are rotatable relative to the drum.

6. The apparatus of claim 1 wherein said cam members are adjustably rotatable relative to each other around a common center.

7. The apparatus of claim 1 wherein said cam members include facing sides, and facing sides are adjustably spreadable relative to each other.

8. The apparatus of claim 7 wherein said cam members include a peripheral edge and are connected to each other along said peripheral by a hinge, said cam members being spreadable by a central gear cooperatively associated with said cam members.

9. The apparatus of claim 1 wherein said means for adjusting the rotational starting position of the guide means comprises a rotatable cam having a peripheral surface which is engaged by a rocker lever connected to at least one of said shafts.

10. The apparatus of claim 1 wherein said means for stepwise rotation of said drum includes a cam member with a curved path from which the stepwise rotation of the drum is derived, the time duration of each stepwise rotation being shorter than the intervening intervals of non-rotation.

11. The apparatus of claim 10 wherein said cam member is mounted on an output shaft of a motor for rotation thereof, said curved path being coupled to a rocker arm by a linkage means extending therebetween, said rocker arm being mounted for rotation along the axis of the drum and engaging the drum for stepwise rotation of the drum.

12. The apparatus of claim 1 wherein at least one of the curved path sections of said cam members has an enlargement overlapped by the curved path section of the other of the cam members.

13. The apparatus of claim 1 wherein at least one of the curved path sections extends in the form of a spiral from the outside toward the inside.

14. The apparatus of claim 3 wherein said kneading station includes a kneading tool which engages the dough in the facing opening and is moved in a circular motion relative to the facing opening.

15. The apparatus of claim 2 wherein said portioning station includes a press-in tool for pressing the dough into the facing receiving opening.

* * * * *